United States Patent Office 3,464,729
Patented Sept. 2, 1969

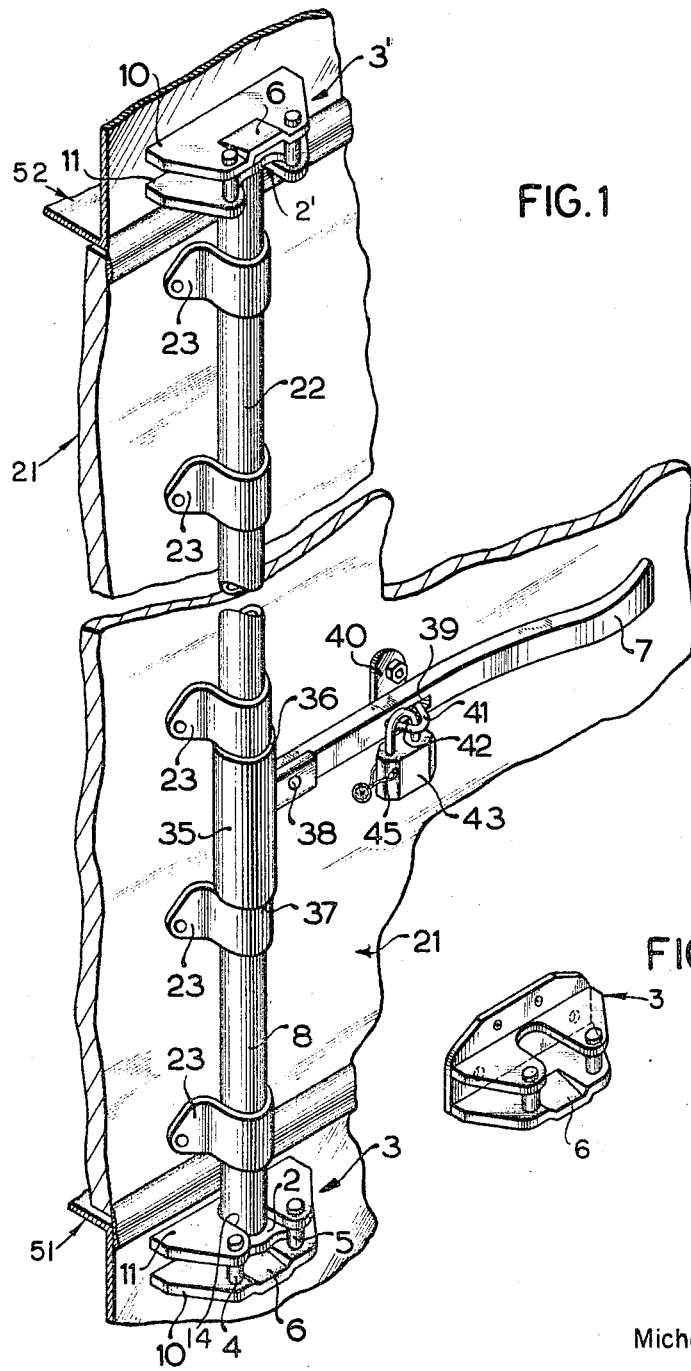

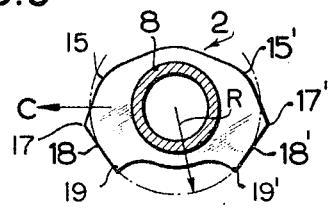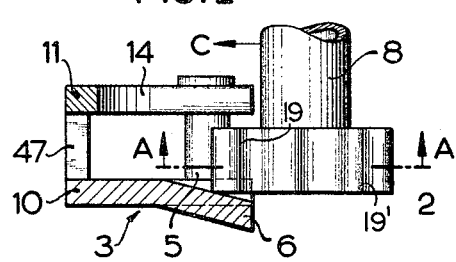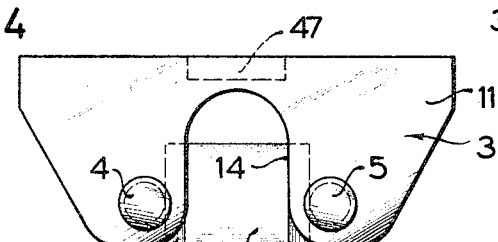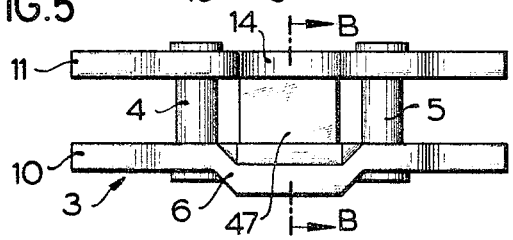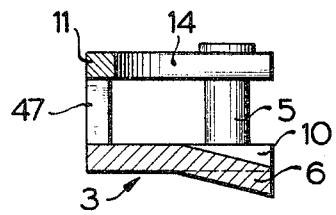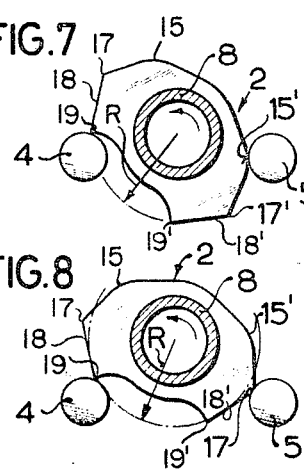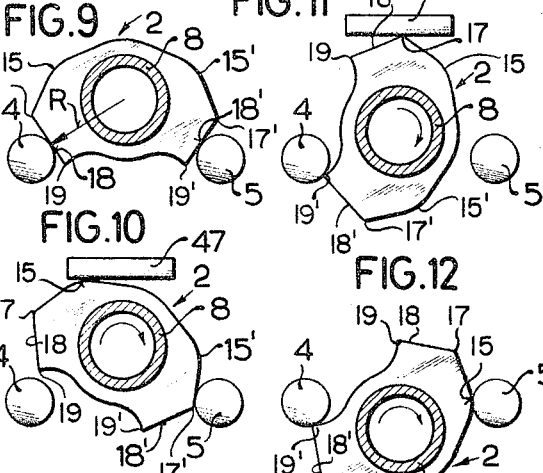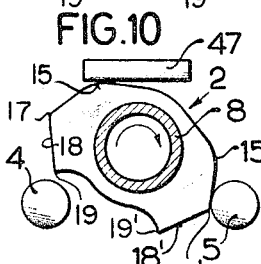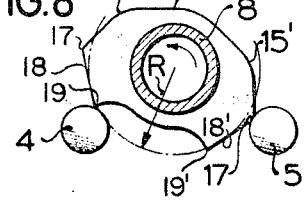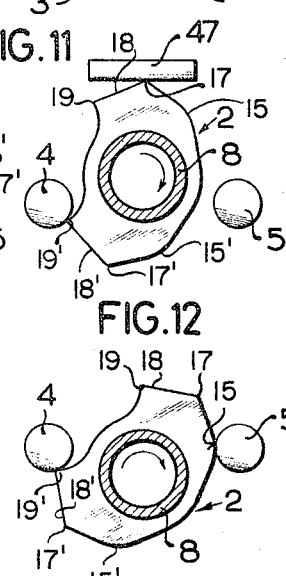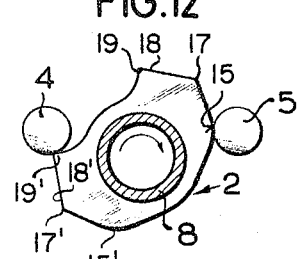
INVENTOR
Michael B. Chambers

3,464,729
DEVICE FOR CLOSING AND LOCKING A DOOR, IN PARTICULAR FOR VEHICLES AND CONTAINERS
Michael B. Chambers, Cobham, England, assignor to Blair Products SA., Geneva, Switzerland, a company of Switzerland
Filed Mar. 21, 1968, Ser. No. 715,008
Claims priority, application Switzerland, Mar. 22, 1967, 4,097/67
Int. Cl. E05c *3/04, 3/14*
U.S. Cl. 292—218                           13 Claims

ABSTRACT OF THE DISCLOSURE

Device for closing and locking of a door, particularly for utility vehicles and containers, having a rotatable locking unit rigidly connected to the door and includes two spaced identical cams; a seat unit for each cam each identical to one another, fixed to the frame of the door; each cam being oval-shaped (2 and 2') and fixed to the outer ends of two rotatable rods (8 and 22) which extend parallel to one side of the door (21) and which are connected by a sleeve (35); said cams (2 and 2') are each provided with two corners (19 and 19') and two projections (17 and 17') situated outside a radius of closure (R), and also having two bosses (15 and 15') situated within the radius of closure; the two seat units (3, 3') are two identical seating units, each seating unit (3) for example, has two parallel supporting plates (10 and 11), between which the oval cam (2) can be accommodated, the inner plate (11) having a slot (14) to receive the rotatable rod (8), the plates being connected by a base plate (47) and two pins (4, 5) and fixed to the frame of the door (51, 52); rotation of the cam (2) by rod (8) locks it within the seat behind the pins (4 and 5).

SUMMARY

The invention has for its object a device for the closing and locking of a door, particularly for utility vehicles and containers, composed of a first portion rigidly secured to the door and of two second portions, identical to one another, fixed to the frame of the door.

The known devices of this kind have certain disadvantages with regard to the alignment of the various portions of the fastener and with the case of closing and opening the door and its lock.

The purpose of this invention is to provide an effective, reliable, robust device, at low cost, which overcomes the disadvantages in the known devices.

The device according to the invention is characterized in that the first portion comprises two oval cams fixed to the outer ends of two rods which extend parallel to one edge of the door and which are united by a sleeve; in that the oval cam is provided with two corners and two projections situated outside a radius of closure; two bosses are situated within the radius of closure; secondly that two seatings each having two parallel supporting plates between which the cam can be accommodated; the inner plate of each seat having a recess to receive the rod; and the plates being connected by a base plate and two pins; the base plate being fixed to the frame of the door.

These objects and others will be apparent from the following description of the accompanying drawings in which:

Description of drawings

FIGURE 1 is a perspective view of a device forming the subject of the invention showing the door in the closed and locked position;

FIGURE 1a is a detail from FIGURE 1, illustrating on a larger scale one of the seat members;
FIGURE 2 is a vertical section of a detail of the device (locking cam and its corresponding seating portion);
FIGURE 3 is a horizontal section on the line A—A in FIGURE 2;
FIGURE 4 is a plan view of one of the seating units of the device;
FIGURE 5 is a vertical section, parallel to the door, of the portion shown in FIGURE 4;
FIGURE 6 is a vertical section on the line B—B in FIGURE 5;
FIGURES 7 to 12 illustrate diagrammatically various locking and unlocking positions.

Description of invention

In FIGURE 1, the movable door bears the reference numeral 21. A certain number of straps 23 are fixed to the outer face of this door 21, which straps serve as a housing and for the guiding of two rods 8 and 22 which extend vertically. A sleeve 35 connects the two rods 8 and 22; actually, the bore in said sleeve 35 permits the introduction of the two rods 8 and 22 and their fixing in the sleeve 35 by welding, riveting, keying, etc.

The two straps 23 which are adjacent to the sleeve 35 are fixed to the door with an axial spacing such that the sleeve 35 and the rods 8 and 22, which are fixed by the welds 36 and 37 to the sleeve 35, have a small axial clearance.

The sleeve 35 has a lug 38 to which there is bolted a lever 7. This lever 7 has a slot 39 which cooperates with the staple-portion 41 of a retaining member 40, fixed to the door 21. The projecting portion 41 comprises a triangular hole 42 which holds the bow of a padlock 43. Since the hole 42 is triangular and the bow cross-section circular, there is room for the introduction of the wire of a customs seal if necessary.

The padlock 43 has a hole 45 in its body which passes through the bow in such a manner that the wire of a second customs seal can be introduced therein.

The two rods 8 and 22 are respectively equipped at their outer ends with identical oval cams 2 and 2' (FIGURES 2, 3, 7, to 12), the shape and operation of which will be explained below with reference to the lower oval cam 2.

Two seatings 3, 3' forming the two second portions of the device are fixed to the frame 51, 52 of the door with a spacing equal to that between the two cams 2 and 2'. They are identical in shape and operation. The seating 3 consists of two supporting plates 10 and 11 in parallel arrangement with an internal spacing slightly larger than the thickness of the cams. Referring to FIGURES 1, 1a, 2 and 4, the outer plate 10 has a bevelled portion 6 while the plate 11 is provided with a shaft receiving slot 14 adapted to receive the rod 8. A base plate 47 connects the two supporting plates 10 and 11. Two pins 4 and 5 are mounted between the two plates 10 and 11.

OPERATION

The device described operates as follows (FIGURES 7 to 12): The lever 7 is turned horizontally, the door 21 being open, at about 90°, until the cams 2 appear in the direction of the arrow C (FIGURE 3) facing the free space between the two plates 10 and 11. This position is illustrated in FIGURE 2. The bevelled planes 6 serve to correct the vertical position of the movable portion of the device with respect to the fixed seats 3 and 3'.

Once the cams have been introduced into the seatings 3 and 3', the lever 7 is turned in the opposite direction, towards the position shown in the drawing of FIGURE 1. The corner 10 of the cam 18 then comes to bear behind the first pin 4 as shown in FIGURE 7 while the boss 15' touches the second pin 5. The rod 8 bears against the wall of the shaft receiving slot 14. The boss 15 tends to correct the position of the corner 19 on the first pin 4.

On continuation of the rotation of the lever 7 (and of the rod 8), the cam 2 continues to enter its seating 3 until the projection 17' comes into contact with the second pin 5 (FIGURE 8).

Since the corner 19 and the projection 17' are situated outside the radius of closure R (FIGURE 9) an effort is necessary to continue the rotation of the lever 7. Once the projection 17 is inside the seating 3, the corner 19 can come forward and the cam 2 is in the final position of closure (FIGURES 1 and 9) in which the two straight sides (18 and 18') of the cam 2 bear against the two pins 4 and 5.

For opening, the cam 2 bears first against the base plate 47 (FIGURE 10). After the free passage of the projection 17', the corner 19' touches the first pin 4 at the front and is held there (FIGURE 11) while the projection 17' slides over the base plate 47. The cam 2 then begins to emerge, with the rod 8, and a final effort is necessary in order to release it completely, the boss 15 touching the pin 5 and displacing the corner 19' towards the left, as shown in FIGURE 12.

While this invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention.

What I claim is:

1. A device for the closing and locking of a door member which is hingedly connected to a frame member, comprising:
   (a) locking cam means mounted on one of the members adjacent and extending beyond the edge thereof;
   (b) seating means for receiving said locking cam means which is mounted on the other of said members opposite said locking cam means;
   (c) said locking cam means including a rotatable rod on which a cam having an approximate oval-shape is mounted;
   (d) said locking cam being irregularly shaped and symmetrical about a plane passing therethrough perpendicular to its major axis;
   (e) said cam having a flat surface at either end facing said seating means, and tangential to a radius of closure extending from the center of said rod, the extremities of said flat cam surfaces extending slightly out beyond said radius of closure;
   (f) said seating means having two circular spaced vertical members between which said cam is passed and which have part of an inner periphery on the radius of closure, so that said cam can be moved between said vertical members and rotated to force said extremities beyond said vertical members and said flat cam surfaces into tight engagement with the periphery of said vertical members along the radius of closure.

2. The device for the closing and locking of a door as set forth in claim 1, wherein:
   (a) said seating means includes two spaced flat plates spaced apart slightly more than the thickness of said cam, and between which said cam is received.

3. The device for the closing and locking of a door as set forth in claim 2, wherein:
   (a) said vertical circular members are pin members which are supported at each end by the plates and are disposed adjacent the front thereof facing said cam.

4. The device for the closing and locking of a door as set forth in claim 2, wherein:
   (a) one of said plates has a slot to receive said rotatable rod to permit the cam to be seated between said plates and behind said vertical circular members.

5. The device for the closing and locking of a door as set forth in claim 2, wherein:
   (a) one of said plates has a bevelled portion which engages the forward edge of said cam so as to correct the vertical position of the cam with respect to the two spaced plates of said seating means.

6. A device for the closing and locking of a door member hingedly connected to a frame member, comprising:
   (a) locking cam means mounted on one of the members adjacent and extending beyond the edge thereof;
   (b) seating means for receiving said locking cam means which is mounted on the other of said members opposite said locking cam means;
   (c) said locking cam means including a rotatable rod on which a cam having an approximately oval-shape is mounted;
   (d) said locking cam being irregularly shaped and symmetrical about a plane passing therethrough perpendicular to its major axis;
   (e) said cam having a flat surface at either end facing said seating means, and tangential to a radius of closure extending from the center of said rod, the extremities of said flat cam surfaces extending slightly out beyond said radius of closure;
   (f) said seating means having two spaced curved surfaces disposed on the radius of closure, between which said cam is moved, and subsequently wedged behind on rotation of said cam where one of the extremities of each of the flat cam surfaces is forced behind a corresponding curved surface of said seating means to provide tight line contact between said flat cam surfaces and said curved surfaces of said seating means.

7. The device for the closing and locking of a door as set forth in claim 6, wherein:
   (a) said seating means includes cam positioning means for guiding said cam into engagement with said cam seat engaging surfaces.

8. The device for the closing and locking of a door as set forth in claim 6, wherein:
   (a) said rotatable rod has an elongated lever attached thereto so that each of said cam members may be simultaneously rotated on movement of said lever.

9. The device for the closing and locking of a door as set forth in claim 6, wherein:
   (a) said locking cam means is positioned on said door and includes a locking cam at both the lower and upper edges thereof connected by a rotatable shaft; and
   (b) said seat means includes a seating unit positioned on said frame member immediately adjacent each of said locking cam members.

10. The device for the closing and locking of a door as set forth in claim 9, wherein:
    (a) said rotatable rod is supported by a plurality of straps which extend thereover and are fastened to said door.

11. The device for the closing and locking of a door as set forth in claim 9, wherein:
    (a) said door has locking means thereon for locking said lever in a closed position.

12. The device for the closing and locking of a door as set forth in claim 9, wherein:
    (a) said seating means includes two spaced plates connected by two upright pins, a part of the periphery of each pin comprising said locking cam seat engaging surface of said seating means.

13. The device for the closing and locking of a door as set forth in claim 12, wherein:
(a) said locking means includes an outwardly projecting staple of triangular configuration which passes through a slot in said lever and is of sufficient size to accommodate the bow of a padlock, and the wire of a seal.

References Cited

UNITED STATES PATENTS

| 2,204,753 | 6/1940 | Dwyer | 292—218 |
| 2,236,594 | 4/1941 | Dwyer | 292—241 |
| 2,765,189 | 10/1956 | Forssell | 292—340 |
| 2,795,448 | 6/1957 | Johnson | 292—216 |
| 3,347,583 | 10/1967 | Hallberg | 292—194 |

MARVIN A. CHAMPION, Primary Examiner

R. L. WOLFE, Assistant Examiner

U.S. Cl. X.R.

292—240